(12) United States Patent
Hermann et al.

(10) Patent No.: US 6,903,947 B2
(45) Date of Patent: Jun. 7, 2005

(54) POWER SUPPLY WITH A REDUCED HARMONIC LOAD ON THE MAINS SYSTEM, AND A CORRESPONDING APPLIANCE

(75) Inventors: Wolfgang Hermann, Tennenbronn (DE); Michel Thibault, Villingen-Schwenningen (DE); Jean-Paul Louvel, Brigachtal (DE)

(73) Assignee: Thomson Licensing S.A., Boulogne-Billancourt (FR)

(*) Notice: Subject to any disclaimer, the term of this patent is extended or adjusted under 35 U.S.C. 154(b) by 0 days.

(21) Appl. No.: 10/471,524

(22) PCT Filed: Mar. 1, 2002

(86) PCT No.: PCT/EP02/02239

§ 371 (c)(1),
(2), (4) Date: Sep. 10, 2003

(87) PCT Pub. No.: WO02/075779

PCT Pub. Date: Sep. 26, 2002

(65) Prior Publication Data

US 2004/0105282 A1 Jun. 3, 2004

(30) Foreign Application Priority Data

Mar. 16, 2001 (DE) .......................... 101 13 297
Dec. 19, 2001 (DE) .......................... 101 62 491

(51) Int. Cl.$^7$ .............................................. H02M 1/00
(52) U.S. Cl. .................................... 363/69; 363/71
(58) Field of Search ........................ 363/21.12, 65, 363/71, 89, 67, 69

(56) References Cited

U.S. PATENT DOCUMENTS 5,369,564 A * 11/1994 Choi ........................ 363/71
5,532,917 A   7/1996 Hung
5,737,204 A * 4/1998 Brown ...................... 363/89

(Continued)

FOREIGN PATENT DOCUMENTS

DE   196 10 762 A1   9/1997   ............ H02M/1/12
EP   0 588 168 A2    3/1994   ............ H02M/3/335

(Continued)

OTHER PUBLICATIONS

"Design for Redundant Power Supply for Server Systems" Research Disclosure, Kenneth Mason Publications, Hampshire, Great Britain, No. 435, Jul. 2000, pp. 1242–1243.

(Continued)

Primary Examiner—Michael Sherry
Assistant Examiner—Gary L. Laxton
(74) Attorney, Agent, or Firm—Joseph S. Tripoli; Harvey D. Fried; Sammy S. Henig

(57) ABSTRACT

The power supply according to the invention has a first switched-mode power supply and a second switched-mode power supply, which is connected in parallel with the first, and with both switched-mode power supplies having power factor correction. In this case, the first switched-mode power supply has an active power factor correction circuit, for example with a current pump which contains a coil which is coupled to a primary winding of a transformer, and the second switched-mode power supply has a power factor coil (NS) in its power supply for power factor correction. Both switched-mode power supplies are in this case arranged in one appliance, in particular in parallel and downstream from a common mains switch. The active power factor correction in this case flattens the pulsed current flow, and the power factor coil shifts the phase of the pulsed current flow. Since the current flows in the switched-mode power supplies, which are connected in parallel, are added to one another, this addition results in additional broadening of the pulsed current flow, which leads to a further improvement in the power factor for the power supply, and/or the inductance of the power factor coil can in consequence be chosen to be correspondingly lower.

6 Claims, 3 Drawing Sheets

U.S. PATENT DOCUMENTS

| | | | |
|---|---|---|---|
| 5,796,595 A * | 8/1998 | Cross | 363/71 |
| 5,910,891 A | 6/1999 | Jo | |
| 5,949,660 A * | 9/1999 | Rehm et al. | 363/21.07 |
| 5,986,898 A * | 11/1999 | Meitzner et al. | 363/21.04 |
| 6,034,489 A * | 3/2000 | Weng | 315/307 |
| 6,088,242 A | 7/2000 | Koegel et al. | |
| 6,272,027 B1 * | 8/2001 | Fraidlin et al. | 363/26 |
| 6,282,109 B1 * | 8/2001 | Fraidlin et al. | 363/89 |

FOREIGN PATENT DOCUMENTS

| | | | | |
|---|---|---|---|---|
| EP | 0 588 172 A2 | 3/1994 | | H02M/3/335 |
| EP | 0 588 173 A2 | 3/1994 | | H02M/3/335 |
| EP | 0 700 145 A2 | 3/1996 | | H02M/1/12 |
| EP | 913 915 A | 5/1999 | | |
| EP | 987 814 A | 3/2000 | | |

OTHER PUBLICATIONS

T. Kohama et al., "*Characteristics of a Parallel–Module High Power–Factor AC–to–DC Converter System with Current–Balancing Controllers*", Telecommunications Energy Conference, Netherlands Oct. 29–Nov. 1, 1995, New York, NY, USA, IEEE, US, Oct. 29, 1995, pp. 791–795.

\* cited by examiner

POWER SUPPLY WITH A REDUCED HARMONIC LOAD ON THE MAINS SYSTEM, AND A CORRESPONDING APPLIANCE

This application claims the benefit under 35 U.S.C. § 365 of International Application PCT/EP02/02239 filed Mar. 1, 2002, which claims the benefit of German Application No. 101 62491.3 filed Dec. 19, 2001 and German Application No. 10113297.2 filed Mar. 16, 2001.

BACKGROUND OF THE INVENTION

The present invention is based on a power supply having two switched-mode power supplies. The first switched-mode power supply comprises in particular a current pump with a coil for an active power factor correction and the second switched-mode power supply comprises a power factor coil in its current supply.

It is known for entertainment electronic appliances to use two switched-mode power supplies to supply power to the very wide range of circuit components, which switched-mode power supplies are connected in parallel in order to provide the necessary number of supply voltages, and/or in order to make it possible to switch off specific circuit groups as a function of a chosen operating mode. In television sets, for example, which have an Internet module or a digital decoder, it is worthwhile using a separate switched-mode power supply for this circuit unit, which separate switched-mode power supply is switched on and off as required, with this unit.

Switched-mode power supplies result in a highly pulsed load on the line network, which leads to harmonic currents in the line network. This load occurs in the region of the voltage maximum of the sinusoidal mains voltage, in which region an energy storage capacitor in the switched-mode power supply is recharged. Appliances having a relatively high power consumption, such as relatively large television sets, must therefore now satisfy specific regulations with regard to the harmonic currents. The harmonic load on the line network from an appliance can in this case be specified by a so-called power factor.

It is known for a so-called "preconverter" to be used for active power factor correction in order to reduce the harmonic load in the line network, which preconverter is connected upstream of the switched-mode power supply and has a coil to which a current is applied cyclically by a switch. This results in a quasi-continuous current flow from the line network.

Furthermore, switched-mode power supplies are known which use power factor correction with a so-called current pump, for example from DE-A-196 10 762, EP-A-0 700 145 and U.S. Pat. No. 5,986,898. These have a first current path on the primary side, through which an energy storage capacitor in the switched-mode power supply is charged via a diode and a mains rectifier in the switched-mode power supply, and have a second current path with an inductance which is arranged between the mains rectifier and the primary winding of the transformer. The energy storage capacitor is in this case charged predominantly via the second current path. The inductance of the second current path thus acts like a current pump which, controlled by the switching transistor, draws a continuous current or at least a broadened current flow from the line network, in order to improve the power factor. In this sense, these appliances are thus also switched-mode power supplies with active power factor correction since, in the case of these switched-mode power supplies as well, an at least broadened current flow is produced from the switched-mode power supply, with an improved power factor, via a coil and by means of a transistor, in this case the switching transistor of the switched-mode power supply.

A further switched-mode power supply with active power factor correction is known from EP-A-0 588 168, EP-A-0 588 172 and EP-A-0 588 173. This likewise has two current paths, with the first current path connecting the bridge rectifier via a diode directly to the primary winding of a transformer. The primary winding thus operates directly with the rectified mains voltage. An energy storage capacitor is arranged in the second current path and is discharged via a second switching transistor as a function of the first switching transistor, in order to improve the ripple on the output voltages from the switched-mode power supply.

It is also known that it is possible to improve the power factor by means of a coil which is arranged at the input of the switched-mode power supply, in particular upstream of the energy storage capacitor. This coil is also known as a mains frequency coil, 50 Hz coil or power factor coil. In order to avoid confusion with other coils, the term power factor coil is used throughout the description here.

However, this power factor coil requires a relatively large amount of inductance to achieve sufficiently good power factor correction. A further disadvantage is that, when the mains switch is operated in order to switch the appliance off, the current flow in the power factor coil is interrupted suddenly. The energy stored in the power factor coil must, however, be dissipated. Since the open mains switch represents the highest impedance in the circuit, a very high voltage is therefore developed across the switching contacts of the mains switch, leading to arcing. Depending on the configuration of the switch, the rate at which the switch opens may also be comparatively slow, so that the arc is produced until the end of that mains half-cycle. In this case, no high voltage is formed across the contacts, but, in both cases this means that the mains switch ages more quickly, and the switch represents a safety risk since, in the worst case, it becomes a potential fire source.

If an appliance has two switched-mode power supplies, but only one mains cable which connects the two switched-mode power supplies to the line network, then the appliance is regarded as a unit which must comply with the regulations for power factor correction.

SUMMARY OF THE INVENTION

The power supply according to the invention has a first switched-mode power supply and a second switched-mode power supply, which is connected in parallel with the first, and which each have their own power factor correction. The first switched-mode power supply has an active power factor correction circuit, and the second switched-mode power supply has a power factor coil in the power supply to the second switched-mode power supply for power factor correction. The active power factor correction in this case flattens the pulsed current flow, and the power factor coil shifts the phase of the pulsed current flow. Both switched-mode power supplies are in this case arranged, in particular in parallel, downstream from the mains switch of an appliance.

This results in a power supply having the following surprising advantages: the problem of excessively loading the mains switch now no longer exists, since the energy which is stored in the power factor coil is now dissipated via the energy storage capacitor of the first switched-mode power supply when the mains switch is switched off, since the two switched-mode power supplies are connected in parallel, that is to say the mains switch is not loaded by the power factor coil on switching off. This leads to the appliance having high reliability, while also using a power factor coil.

Furthermore, the two different principles for power factor correction lead to construction addition of the two current flows: the active power factor correction with a current pump leads to flattening of the pulsed current flow, that is to say the current flow angle is broadened both before and after the voltage maximum of the mains voltage. The pulsed current flow of the second switched-mode power supply is, however, shifted in phase by the power factor coil with a lagging phase, so that it leads mainly to broadening of the current flow angle after the voltage maximum of the mains voltage. Since the two current flows of the switched-mode power supplies, which are connected in parallel, are added to one another, this addition results in an additional improvement in the power factor for the power supply. The inductance of the power factor coil can in consequence be chosen to be less by a factor of two than would actually be necessary for the power of the second switched-mode power supply.

The combination of the two different power factor correction circuits is thus an optimum configuration for an appliance which contains a power supply with two switched-mode power supplies, and involves only a small amount of complexity for the second switched-mode power supply. The invention is applicable in particular to television sets with digital circuits, and to other entertainment electronic appliances which have a relatively high power consumption.

The invention will be explained in more detail in the following text using, by way of example, an exemplary embodiment which is illustrated schematically in the figures, in which:

DETAILED DESCRIPTION OF THE DRAWINGS

Figure 1:
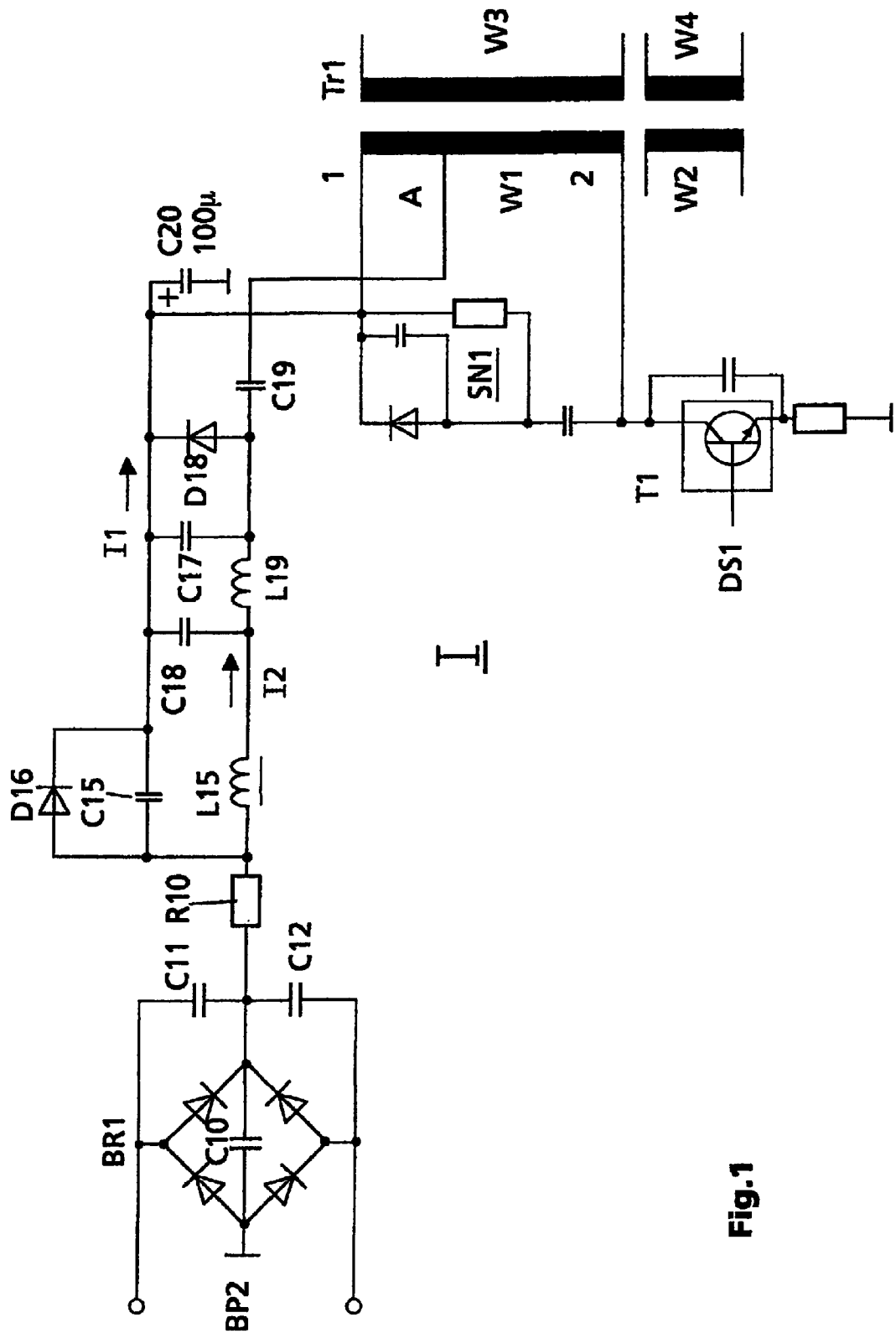
FIG. 1 shows a circuit diagram of a first switched-mode power supply with an active power factor correction circuit.

FIG. 1 shows, in simplified form, a switched-mode power supply I with a mains rectifier BR1, an energy storage capacitor C20, a switching transistor T1 and a transformer Tr1, which has a primary winding W1 and secondary windings W2–W4. The mains rectifier BR1 has an input connection BP2, via which the rectifier is connected to a mains switch (not shown) of a corresponding appliance and to the line network, and is used for rectification of the mains voltage. The output from the mains rectifier BR1 is connected via two current paths I1 and I2 to the transformer Tr1: it is connected via the first current path I1 to a connection 1 of the primary winding W1 and to the energy storage capacitor C20, and is connected via the current path I2 to a tap A on the primary winding W1. The current path I1 has a diode D16, which provides decoupling between the second current path I2 and the energy storage capacitor C20.

The current path I2 has a coil L19 which results in active power factor correction, and a capacitor C19 for current limiting in the current path I2. A diode can also be used in the current path I2 instead of the capacitor C19. The tap A may also be identical to the connection 1 or 2 of the primary winding W1. A resistor R10 which is connected downstream from the mains rectifier BR1 likewise provides current limiting, in this case for both current paths I1 and I2.

The transformer TR1 produces, in a known manner, mains isolation between the primary side and the secondary side of the switched-mode power supply. The switching transistor T1, which is connected in series with the primary winding W1, is driven by a driver stage (not shown) with switching signals DS1, resulting in power being transmitted to the secondary windings W3 and W4 which are arranged on the secondary side, as is known. The switched-mode power supply in this case operates on the principle of a flyback converter, as is frequently used for switched-mode power supplies in entertainment electronic appliances.

In this case, the switched-mode power supply operates as follows: once the appliance has been switched on, the energy storage capacitor C20 is first of all charged via the resistor R10 and the current path I1. The resistor R10, which has a small resistance of, for example, 2.7 ohms, in this case limits the current flow. The energy storage capacitor C20 must be charged for the starting phase of the switched-mode power supply. During normal operation, the switching transistor T1 essentially draws a current via the current path I2, through which the energy storage capacitor C20 is then recharged via a diode D18 and via the primary winding W1.

Ideally, the inductance of the coil L19 in this case results in a continuous current flow from the line network, which leads to a corresponding improvement in the power factor. A coil L15 which is connected upstream of the coil L19 in this case prevents the radio-frequency switching pulses of the switched-mode power supply from propagating via the bridge rectifier BR1 into the power network. The capacitors C10, C11 and C12, which have only a small capacitance, are used to filter the mains voltage or, likewise, for suppression.

The switched-mode power supply has a regulator for stabilizing the output voltages and, using, for example, pulse-width modulation of the driver signals DS1, as a function of the load, for regulation. Since the current flow I2 is controlled by the switching transistor, the energy storage capacitor C20 is thus also recharged as a function of the load on the switched-mode power supply. Further details relating to the operation of this switched-mode power supply and, in particular, relating to active power factor correction are described, for example, in U.S. Pat. No. 5,986,898, and will thus not be explained any further here.

Figure 2:
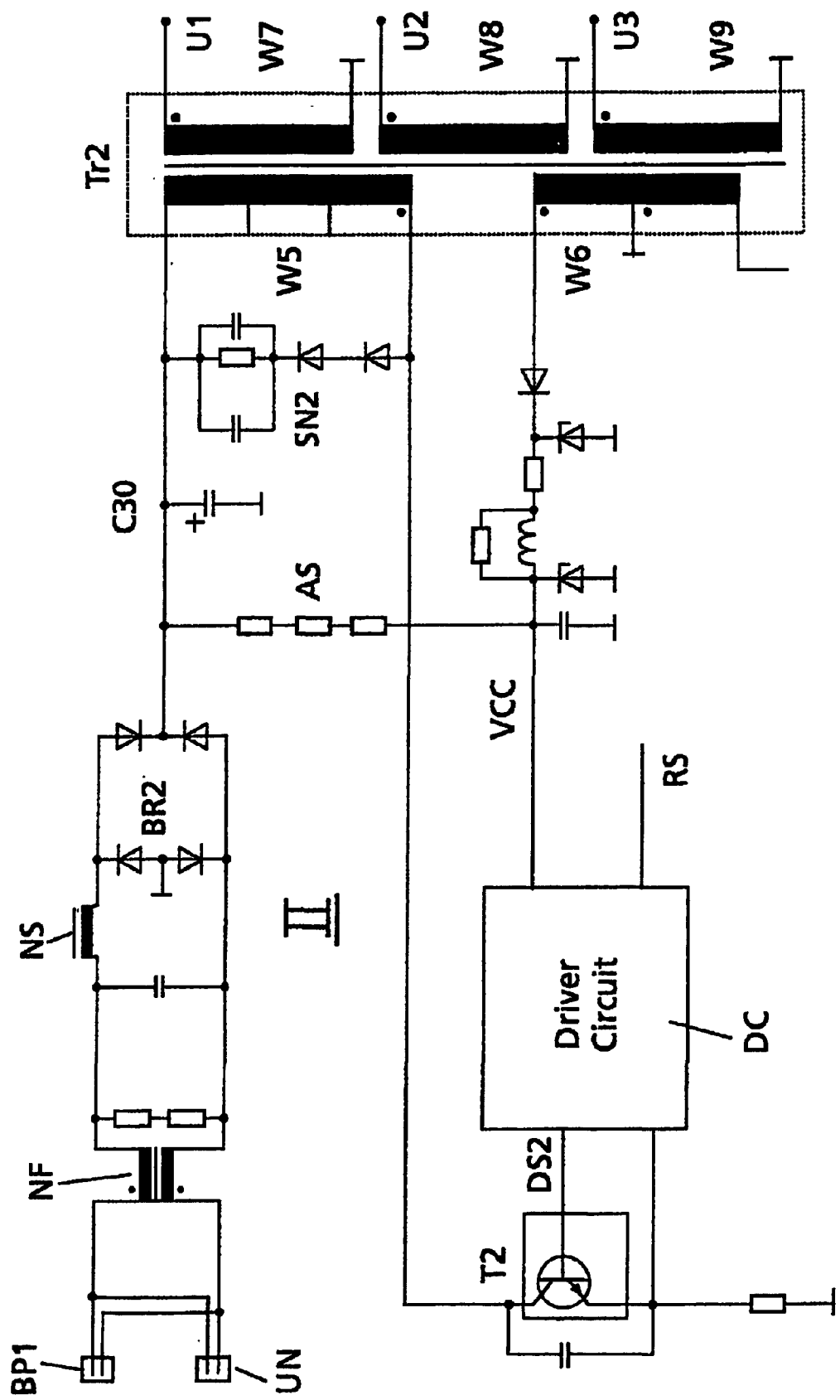
FIG. 2 shows a second switched-mode power supply with a power factor coil for power factor correction.

FIG. 2 shows, schematically, a second switched-mode power supply II, which has a power factor coil NS for passive power factor correction. The power factor coil NS is in this case arranged between a mains filter NF and a mains rectifier BR2 in the switched-mode power supply II. An energy storage capacitor C30 and the primary winding W5 of the transformer Tr2 are connected to the output of the bridge rectifier BR2. Like the transformer Tr1, the transformer Tr2 has secondary windings W6–W9, and its primary winding is likewise connected in series with a switching transistor T2, which is controlled by a driver circuit DC.

A supply voltage VCC for the driver circuit DC is in this case provided via the winding W6 arranged on the primary side, and output voltages U1, U2, U3 for supplying corresponding circuits are provided via the secondary windings W7–W9 arranged on the secondary side. The driver circuit DC in this case regulates the output voltages U1–U3 of the switched-mode power supply with the aid of a regulating signal RS, which can be derived on the primary side or secondary side from one of the secondary windings of the transformer TR2.

The switched-mode power supply II also has a starting circuit AS for starting the switched-mode power supply, and a so-called snubber network SN2, which is used to damp switching spikes when the switching transistor T2 switches off. The power factor coil NS, which is located in the current path of the 50 Hz mains frequency upstream of the bridge rectifier BR2, has an inductance of, for example, 20 mH, so that the charging process for the energy storage capacitor C30 has a considerable delay. Apart from the power factor coil NS, the switched-mode power supply 2 is thus identical to already known flyback converters without power factor correction, and it has only one current path, via which the energy storage capacitor C30 is charged. There is no need for any further components for power factor correction here and, in particular, there is no need to use a transformer with a tap. The switched-mode power supply thus operates together with the power factor coil NS in a corresponding way to a flyback converter without power factor correction, with the difference that the energy storage capacitor C30 is recharged with a current pulse which is broadened and delayed by the inductance of the power factor coil.

The input of the switched-mode power supply II has a connection BP1 which leads to the connection BP2 of the first switched-mode power supply I, and a connection UN, which is connected to the line network via the mains switch and the mains cable of an appliance, which is not illustrated. The switched-mode power supply II is in consequence connected to the mains voltage in parallel with the switched-mode power supply I. The switched-mode power supply II is in this case the smaller switched-mode power supply in the appliance, and can be switched on and off by a control signal from the secondary side, not shown, depending on the operating mode of the appliance.

Figure 3:
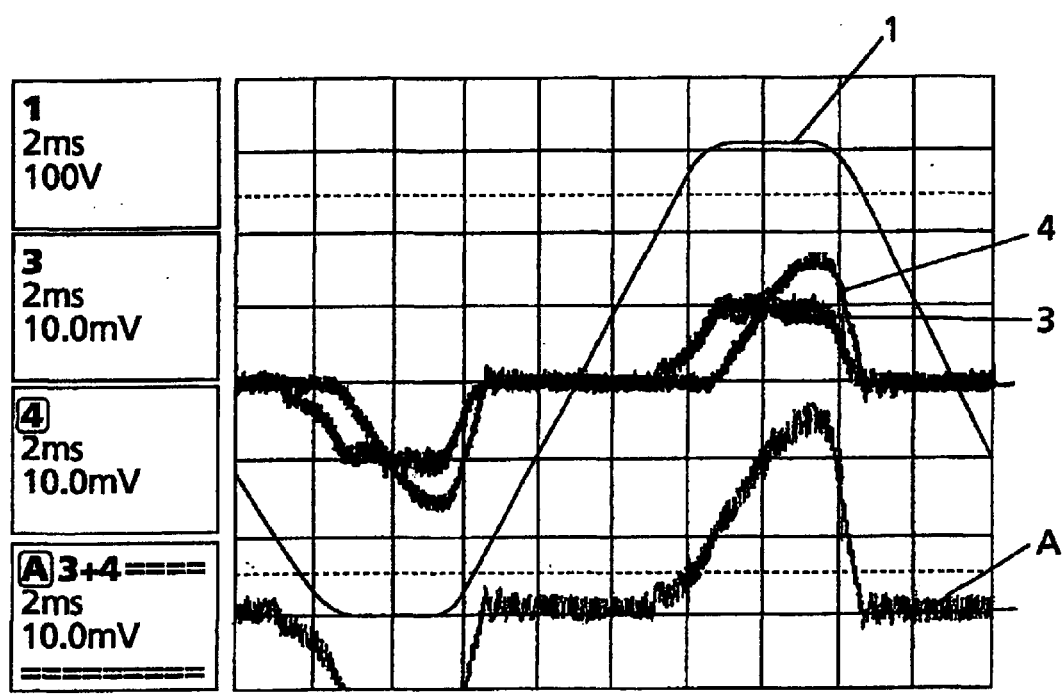
FIG. 3 shows the resultant currents and voltages from the two switched-mode power supplies shown in FIGS. 1 and 2.

The input currents which occur during operation of the two switched-mode power supplies I and II are shown in FIG. 3. The input current of the switched-mode power supply 1 is in this case represented by the curve 3, and the input current of the switched-mode power supply 2 is represented by the curve 4, while the mains voltage that is applied to the appliance is represented by the curve 1. The resultant current flow for the power supply is represented by the curve A. As can clearly be seen from the curve 3, the switched-mode power supply I draws a relatively constant current in a region around the voltage maximum of the mains voltage, curve 1. The current has no phase shift with respect to the mains frequency or mains voltage.

The current flow from the second switched-mode power supply II curve 4, on the other hand, has a gradual rise with a maximum which occurs at a time after the maximum mains voltage. Owing to the different current characteristics of the two switched-mode power supplies I, II, the addition of the two currents thus leads to additional broadening of the current flow, in comparison to a power supply which would use only one circuit principle for power factor correction. The power factor coil NS in the switched-mode power supply II already has a correspondingly reduced inductance in this case than would be necessary for the switched-mode power supply II just to satisfy the power factor correction Standard.

This is illustrated by an example: if the switched-mode power supply II has a mains power consumption of 100 W, then, if it is connected on its own as the sole switched-mode power supply to the mains system, it requires a power factor coil with an inductance of 40 mH to satisfy the power factor correction Standard. However, if this switched-mode power supply is connected in parallel with the switched-mode power supply which likewise has a mains power consumption of 100 W and contains active power factor correction with a current pump, then the inductance of the power factor coil need be only 20 mH for the two switched-mode power supplies, as a power supply, to comply with the limit values in the power factor correction Standard. The power factor coil in the second switched-mode power supply is thus smaller and cheaper.

A cost-effective power supply with two switched-mode power supplies can thus be produced by using one switched-mode power supply with active power factor correction, in particular using a current pump, and with a second switched-mode power supply which has a power factor coil shifting the phase of the input current, which power supply does not excessively load the mains switch in an appliance and in which, furthermore, a power factor coil with a reduced inductance can be used in the second switched-mode power supply. The principle can also be applied to three switched-mode power supplies connected in parallel, in which case a power factor coil can then likewise be used for the third switched-mode power supply.

Further refinements of the invention will be familiar to a person skilled in the art. The invention is not restricted to flyback converters and can likewise be used for other switched-mode power supply concepts, for example in switched-mode power supplies which have two or more switching transistors. In particular, the switched-mode power supply II is not restricted to flyback converters since, when using a power factor coil for power factor correction, nothing need be changed in the design of a switched-mode power supply.

What is claimed is:

1. Power supply having a first switched-mode power supply and a second switched-mode power supply, both being connected in parallel supply and both having a common mains voltage connection providing a pulsed current flow, wherein said first switched-mode power supply comprises a current pump with a coil for an active power factor correction, the coil being coupled to a primary winding of a transformer of said first switched-mode power supply, and said second switched-mode power supply comprises a power factor coil in its current supply in order to shift a phase of the pulsed current flow with regard to the maximum of the mains voltage.

2. Power supply according to claim 1 wherein the first switched-mode power supply comprises a first current path with a diode for charging an energy storage capacitor and a second current path with a coil for producing a connection between a rectifier and a terminal of the primary winding of a transformer.

3. Power supply according to claim 1 wherein the power factor coil is arranged upstream of the mains rectifier of the second switched-mode power supply.

4. Power supply according to claim 3, wherein the inductance of the power factor coil is in a range from 1–30 mH.

5. Power supply according to claim 1 wherein the second switched-mode power supply has a lower output power, in comparison with the first switched-mode power supply.

6. Power supply according to claim 1 wherein both switched-mode power supplies are in the form of flyback converters with mains isolation via a transformer, and in that the second switched-mode power supply can be switched on and off independently of the first switched-mode power supply.

* * * * *